Dec. 1, 1931.  J. W. ROBERTS  1,834,742

TRAIN PIPE CONNECTION

Filed Aug. 23, 1930

Inventor
J. W. Roberts
by J. Edw Maybee
ATTY.

Patented Dec. 1, 1931

1,834,742

UNITED STATES PATENT OFFICE

JOHN WILLIAM ROBERTS, OF SARNIA, ONTARIO, CANADA

TRAIN PIPE CONNECTION

Application filed August 23, 1930. Serial No. 477,211.

This invention relates to the inter-car connections by means of which the air and steam pipes of railway rolling stock are detachably connected, and more particularly to automatic connectors of the type shown in my prior Patents No. 1,121,763, dated December 22nd, 1914, and 1,389,012, dated August 30th, 1921. In such connectors coupling members are held end to end by spring pressure, and the joint is made fluid tight by resilient gaskets. Due to wear and unavoidable deterioration, such gaskets in time will spring a leak, and if such a leak occurs after a train is made up considerable time is wasted in effecting repairs as the train must be cut to separate the couplings.

My object, therefore, is to devise a construction of the connections which will enable a gasket to be replaced without separating the connections.

I attain my object by providing the train pipe connection with a seat for the gasket which is removable through the connection by a movement back from its normal operative position. The gasket holder is normally held in place by means of a cap closing the opening in the connection through which the holder is removable.

Figure 1:
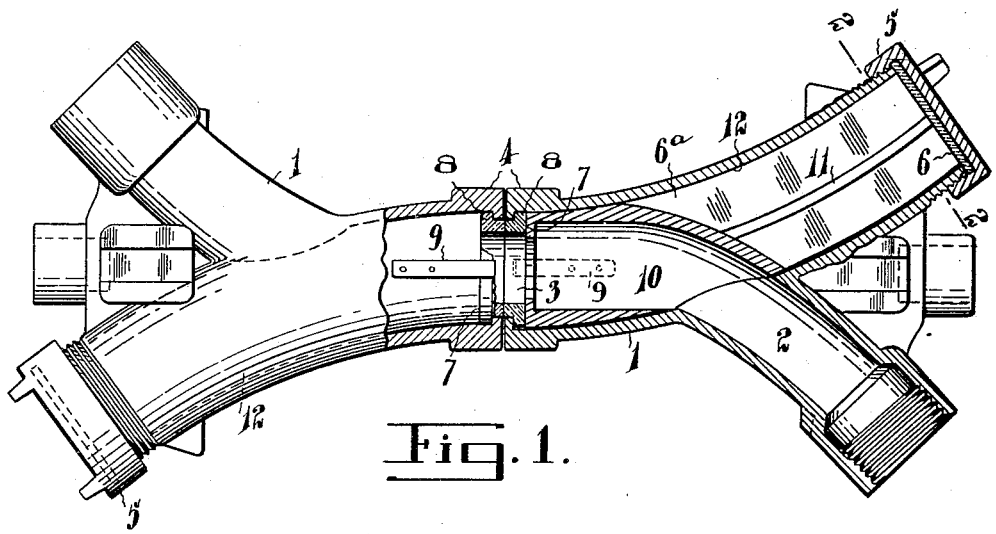
Figure 2:
Figure 3:
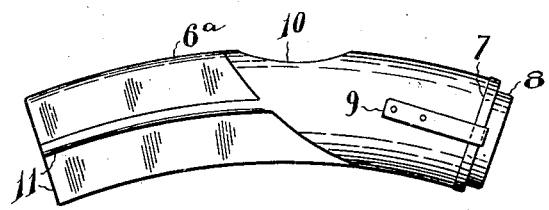

The invention is hereinafter more specifically described and is illustrated in the accompanying drawings in which Fig. 1 is a plan view, partly in section, of a pair of connections in coupled position;

Fig. 2 a section on the line 2—2 in Fig. 1;

Fig. 3 a plan view of the gasket holder; and

Figure 4:
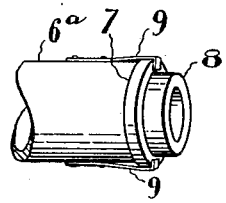

Fig. 4 a perspective view of the forward end of the gasket holder.

In the drawings like numerals of reference indicate corresponding parts in the different figures.

In the drawings, 1 is a train pipe connection such as shown and described in my prior United States patents hereinbefore referred to. This connection is formed with the conduit 2 extending longitudinally and transversely away from the opening 3 formed in the end 4 of the connection. The other end of the conduit is suitably threaded or otherwise adapted for connection with a train line. In the connection is also formed a branch conduit or channel 12, which also extends laterally and longitudinally away from the opening 3, and at its other end is formed with an opening closed by the screw cap 5. A gasket 6 is provided to form a fluid tight closure. The channel 12 is formed longitudinally on an arc of a circle so that the gasket holder 6ª which is fitted therein may be slid longitudinally of the channel to position the gasket in or remove it from a position in the opening 3. The end of the gasket holder which is normally adjacent the opening 3 is formed with a seat 7 against which the gasket 8 is fitted and on which it is held by the spring clips 9 secured to the holder. The part of the holder adjacent the opening 3 has a channel 10 formed therein which, when the holder is in position, communicates with the conduit 2. The end of the holder remote from the opening 3 is preferably formed with the ribs 11, which guide it in the channel 12, though, of course, any suitable guiding construction, involving as little metal as possible, may be substituted. The ends of these ribs 11 abut on the cap 5. The holder and gasket are so proportioned that, when the holder is in position and the cap is screwed back in place, the gasket will be held slightly projecting through the opening 3.

From the above description it will be seen that if the cap 5 be removed the holder 6 may be readily withdrawn, as it will slide readily round the arc of the channel 12. The channel and holder being arc-shaped longitudinally, the gasket 8 is readily adjusted to project as much as may be desired from the face of the end of the connection, as its movements, owing to the position of the centre from which the arc is struck, are within certain limits almost exactly normal to the surface of the end 4.

This device will be particularly useful with train pipe connections used on freight trains, and is also of value with any class of rolling stock.

What I claim as my invention is:

1. A tubular connection having a conduit formed therein terminating in an opening in the end of the connection; a gasket holder fitted within the connection adapted to position a gasket in said opening and channelled to permit passage of fluid through the conduit and opening; and a gasket adapted to project through the opening and formed with a forwardly facing shoulder back of its face; and clips secured to the gasket holder and engaging said shoulder, whereby the gasket has its face free for engagement with an opposed gasket and yet is withdrawable with the holder.

2. A tubular connection having a conduit formed therein terminating in an opening in the end of the connection and a second longitudinally arc-shaped conduit or channel terminating in the same opening and extending to the exterior of the connection; a gasket holder slidable through said channel provided with a channel in its inner end forming a passage for fluid between the first mentioned conduit and opening aforesaid, and a seat for a gasket to be positioned in said opening and spring clips for holding the gasket in place on the seat; and a cap for closing the other end of the channel.

3. A tubular connection having a conduit formed therein terminating in a flanged opening in the end of the connection and a second longitudinally arc-shaped conduit or channel terminating in the same opening and extending to the exterior of the connection; a gasket holder slidable through said channel provided with a channel in its inner end forming a passage for fluid between the first mentioned conduit and opening aforesaid, and a seat for a gasket to be positioned in said opening; a gasket having an annular shoulder formed thereon adapted to engage the flange aforesaid leaving the face of the gasket exposed; a cap for closing the other end of the channel and pressing the gasket against the flange; and spring clips for holding the gasket in place on the seat.

Signed at Sarnia, Ontario, Canada, this 20th day of August, 1930.

JOHN WILLIAM ROBERTS.